UNITED STATES PATENT OFFICE.

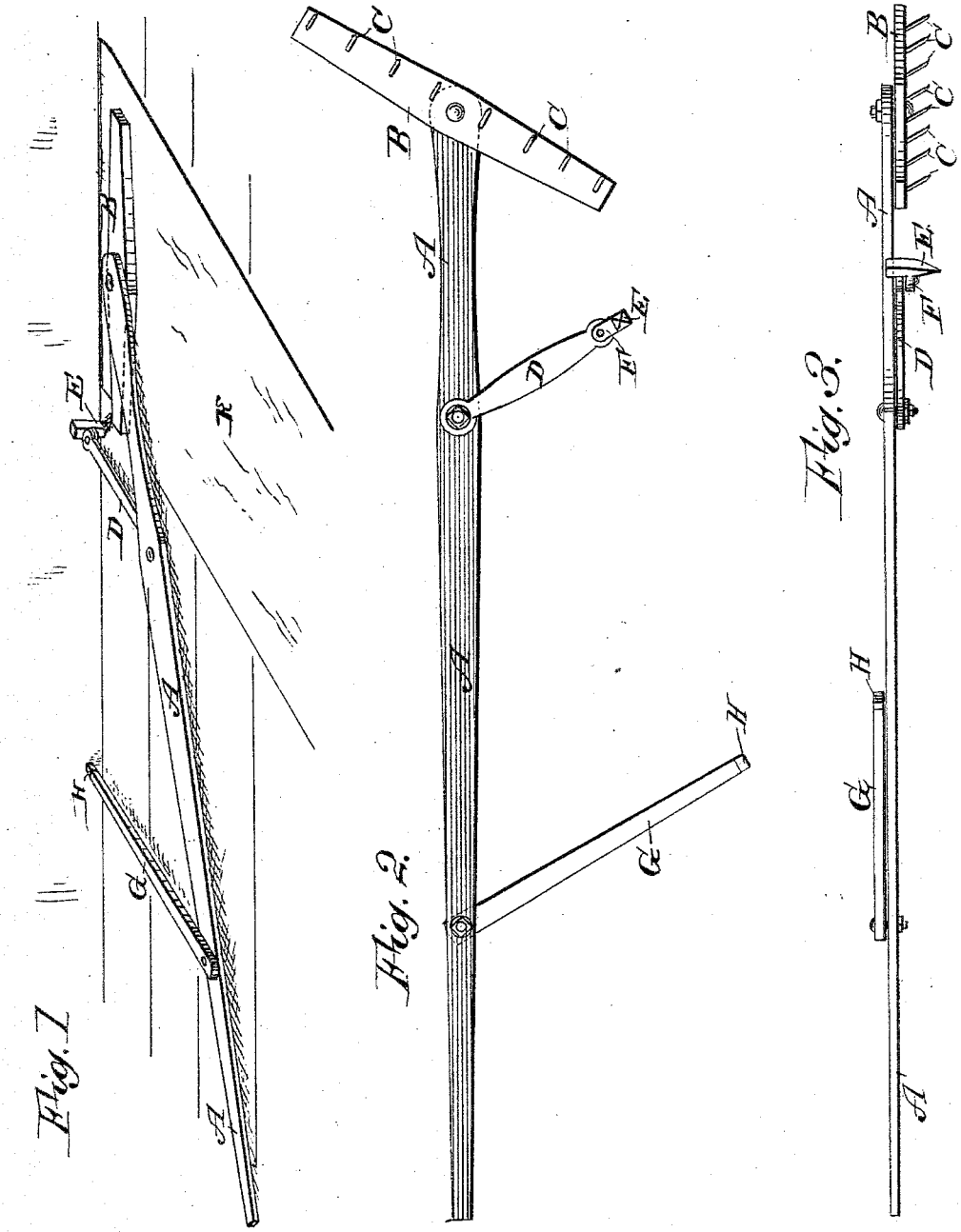

WILLIAM HILL, JR., OF LIMESTONE, ASSIGNOR TO HIMSELF, AND JAMES D. FRANK, OF GREAT VALLEY, NEW YORK.

CARPET-STRETCHER.

SPECIFICATION forming part of Letters Patent No. 303,008, dated August 5, 1884.

Application filed December 12, 1883. (No model.)

*To all whom it may concern:*

Be it known that I, WILLIAM HILL, Jr., of Limestone, in the county of Cattaraugus and State of New York, have invented a new and Improved Carpet-Stretcher, of which the following is a full, clear, and exact description.

My invention relates to an improvement in carpet-stretchers; and it consists in the devices substantially as hereinafter described and claimed.

Reference is to be had to the accompanying drawings, forming part of this specification, in which similar letters of reference indicate corresponding parts in all the figures.

Figure 1 is a perspective view of the stretcher as in use; Fig. 2, an inverted plan view, and Fig. 3 an edge or side view, thereof.

In my construction I provide a suitable lever, A, to which, at one end, I pivot a head, B, so as to swing right or left, in which head I secure eight (more or less) pins, C, placed about two inches apart.

To one side, preferably the under side, of the lever A, I pivot the bar D, and to the end of this bar I pivot-joint a square or angular dog, E, having a lip or projection, F, to receive the pivot-pin. The dog E is made angular in cross-section, so as not to twist out of the floor when drawing or pushing the lever.

To the lever A, toward the back end, I pivot-joint the brace G, which has a rubber tip, H, adapted, when the brace is swung around, to rest against the base-board to hold the stretched carpet in position while it is being tacked. The rubber tip H prevents the brace G from marring the base-board.

The head B, bar D, and brace G, all being connected with the lever by loose joints, allow me to work my stretcher right or left, or in a corner as well.

In operation the dog E is driven into the floor next the base-board and the head pins or teeth C engaged with the unrolled strip of carpet K, a suitable distance from its end to leave room for driving the tacks therein, and lever A (with the brace G folded on it) is worked to draw the carpet toward the baseboard, the pivot-joints at each end of the bar D permitting the carpet-strip to be moved sidewise more or less to make a proper joint with the strip last laid, and when the carpet-strip is drawn to the base-board or side wall the brace G is swung around, with its tip H against the wall to hold the lever and its head B from receding, when the operator may leave the lever and leisurely tack the end of the carpet-strip to place, whereupon the stretcher may be removed for operation on the next strip of carpet.

Having thus described my invention, what I claim as new, and desire to secure by Letters Patent, is—

1. The carpet-stretcher having the toothed head B pivoted to the lever A, in combination with the pivoted bar D, having the pivoted dog E, substantially as and for the purpose specified.

2. The combination of the lever A, pivoted toothed head B, pivoted bar D, pivoted dog E, and pivoted brace G, forming a carpet-stretcher adapted to work right or left handed, substantially as specified.

WILLIAM HILL, JR.

Witnesses:
J. G. DREHMER,
R. J. HAZZARD.